United States Patent [19]
Asla

[11] 3,874,161
[45] Apr. 1, 1975

[54] DEVICE FOR INDICATING USED PARKING TIME
[75] Inventor: Kristoffer Asla, Hamar, Norway
[73] Assignee: Brodrene Asia A/S, Hamar, Norway
[22] Filed: Nov. 28, 1973
[21] Appl. No.: 419,545

[30] Foreign Application Priority Data
Nov. 28, 1972 Norway.............................. 4348/72

[52] U.S. Cl..................... 58/1 R, 58/143, 116/28 R
[51] Int. Cl........................... G04f 1/04, G07c 5/02
[58] Field of Search......... 116/114 R, 28 R; 73/358; 58/144, 1 R, 143

[56] References Cited
UNITED STATES PATENTS
| | | | |
|---|---|---|---|
| 1,261,915 | 4/1918 | Ferdon.................................. | 58/144 |
| 1,694,059 | 12/1928 | Denny.................................. | 58/1 R |
| 2,144,857 | 1/1939 | Schultz................................. | 58/144 |
| 2,870,735 | 1/1959 | Hunt..................................... | 116/28 R |
| 2,942,375 | 6/1960 | Bucic, Jr.,............................ | 58/1 R |
| 3,103,099 | 9/1963 | Hanks.................................. | 58/143 X |
| 3,125,849 | 3/1964 | Wachtel............................... | 58/144 |
| 3,192,771 | 7/1965 | Stearns................................ | 73/358 |

Primary Examiner—Richard C. Queisser
Assistant Examiner—Daniel M. Yasich
Attorney, Agent, or Firm—Holman & Stern

[57] ABSTRACT

For indicating used parking time a device is provided which comprises a container adapted to be attached behind a car window and sub-divided into two superposed chambers, the upper chamber containing visible flowable material, such as sand. The chambers are interconnected by a throttled passage which is opened for starting non-reversible flow of the material at a rate such that the upper chamber is emptied at the expiry of the parking time.

11 Claims, 5 Drawing Figures

3,874,161

DEVICE FOR INDICATING USED PARKING TIME

BACKGROUND OF THE INVENTION

The present invention relates to a device for indicating used parking time.

For determining and collecting fees for time limited car parking it is known to place so-called parking meters along streets and sidewalks. The provision and mounting of such parking meters are, however, very costly, and the expenses for maintenance and repair are very high since the parking meters are very often subjected to violence. Further, the parking meters may be of considerable inconvenience to the pedestrians, and they also interfere with snow removal and cleaning of the sidewalks on which they are mounted. In addition, they may be a disfiguring feature in the look of the town. Parking meters of known type must also be emptied individually for the coins fed thereinto, and considerable time and manpower are required for this.

SUMMARY OF THE INVENTION

The object of the present invention is to provide a device for indicating used parking time which permits parking meters to be dispensed with, whereby payment of the praking fee does not necessarily have to be made at the parking area.

According to the invention this is achieved by providing a device for indicating used parking time, which consists of a closed and at least partly transparent container for once-for-all use, suited for being placed behind a window of a vehicle and accomplished in accordance with the hour-glass principle in so far as it is divided by a throttled flow passage into an upper and a lower chamber, said upper chamber originally containing a quantity of flowable material, but the passage being originally closed and adapted to be opened for downward flow from the upper to the lower chamber at the initial point of a predetermined time, although without the possibility of later reverse flow.

DESCRIPTION OF THE PREFERRED EMBODIMENT

The invention will be further explained with reference to the drawings, which illustrate various embodiments of the device of the invention as well as the use of the same in car parking, and in which FIG. 1 shows an embodiment of the device before use:

Figure 1:
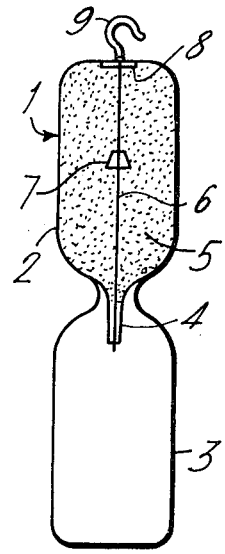

In the embodiment in FIG. 1 the device according to the invention consists of a container 1 divided into an upper chamber 2 and a lower chamber 3 by a tubular throttle passage 4. The container 1 is made of a transparent material, such as transparent plastic, which may have various colours. In the embodiment shown the throttle passage 4 is constituted by a thin tube with a small inner diameter. The upper chamber 2 is filled with a flowable material 5, such as finely grained sand. In the tube 4 there is provided stop means comprising a thread 6 which bars or normally prevents flowing of the sand 5 from the upper chamber 2 to the lower chamber 3, and which extends along the longitudinal axis of the container and out through the top portion of the upper chamber via a sleeve 8. The sleeve 8 tightly embraces the thread 6 and prevents the sand 5 from leaking out from the container 1. The thread 6 carries an abutment means 7 and is equipped with a hook 9 at the top.

FIG. 1 shows the container 1 before use; in this attitude thread 6 then closes the tube 4, and all the sand 5 remains in the upper chamber 2.

Figure 2:
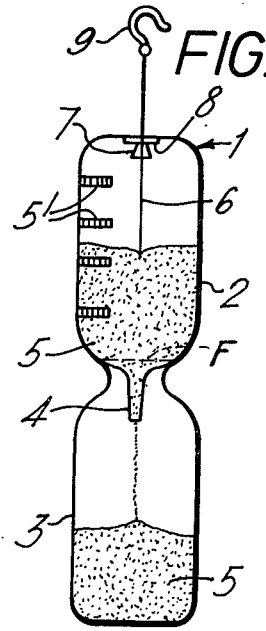
FIG. 2 shows an embodiment of the device during use.

FIG. 2 shows the device after the stop means or thread has been pulled out of the tube 4. The thread 6 is pulled so far out of the container 1 that the abutment means 7 will abut against the sleeve 8. When the tread is pulled out from the tube 4, the latter is opened for flow of sand 5 down from the upper chamber 2 to the lower chamber 3. The container 1 may be attached behind the window of the vehicle by means of the hook 9, and a vertical position of the container 1 is achieved due to the fact that the container 1 is suspended from the thread 6, thereby securing an even and optimum flow of the sand 5 through the tube 4. By giving the upper chamber 2 a colour differing from that of the sand 5, it is clearly indicated how far down the sand 5 in the chamber 2 has sunk. When the upper chamber 2 has run completely empty of sand 5, this will indicate that the permissible parking time has lapsed. By providing e.g. the upper chamber 2 with a graduated scale 5' based on the quantity of flow per time unit through the tube 4, an indication is obtained with respect to how long the vehicle has been parked after the container 1 was placed into use. By placing the container 1 right behind the window of the vehicle, the parking time may also be checked by a person outside the vehicle.

With a shape of the tube 4 as illustrated in FIGS. 1 and 2, the container 1 is suited for being used only, i.e., one time once-for-all. When the given parking time has lapsed, all the sand 5 from the upper chamber 2 will have flowed down into the chamber 3. Even if the container 1 is thereafter inverted and turned upside-down, the sand 5 will not be able to flow back to the upper chamber 2 because the throttle passage will project up into chamber 3 (filled with sand) and sand will be impacted thereabout.

The allotted time which the container 1 will indicate depends on the degree of fineness of the sand 5, the diameter of the tube 4, and of the taper of the tube 4 and the transition from the same to the upper chamber 2. By varying these parameters it is possible to establish the allotted time to e.g. ¼ hour, ½ hour, 1 hour, 2 hours, etc., and devices with various lapsing times may be provided with various colours and with inscription of the parking time permitted. By electing a fixed standard flow capacity for the tube 4, it is possible to use containers of various sizes to cover the various parking times. A large container will allow for a long parking time, such as 2 hours, whereas a small container will give e.g. ¼ hour.

Figure 3:
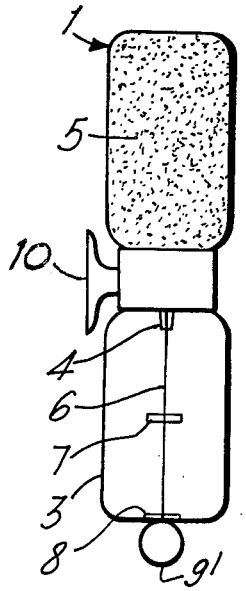
FIG. 3 shows another embodiment of the device of the invention.

In FIG. 3 another embodiment is shown, where the container 1 is equipped with a mounting means 10 operable to secure the container 1 to a plane surface, which in this instance will be the inside of a window of the parked vehicle. Also in this Figure there is shown a thread 6 which functions to open the passage 4, but in this embodiment the thread 6 depends from the tube 4 through the lower chamber 3 and out through the lower wall portion thereof. The use of the container 1 in FIG. 3 is approximately the same as described above in connection with FIGS. 1 and 2. The container 1 is affixed to the inside of a window of the parked vehicle by the fastening means 10, which may comprise a suction cup or a self-adhesive tape, and the thread 6 is pulled down through the lower chamber 3 until it is stopped by engagement of the abutment means 7 with the sleeve 8. When the device is in use, a round plate or ball 9' attached to the outer end of the thread 6, hangs below the device, showing that the passage 4 is open, and that the allotted parking time is running. The plate or ball 9' further serves to facilitate the pulling of the thread 6 out from the tube 4.

Figure 4:
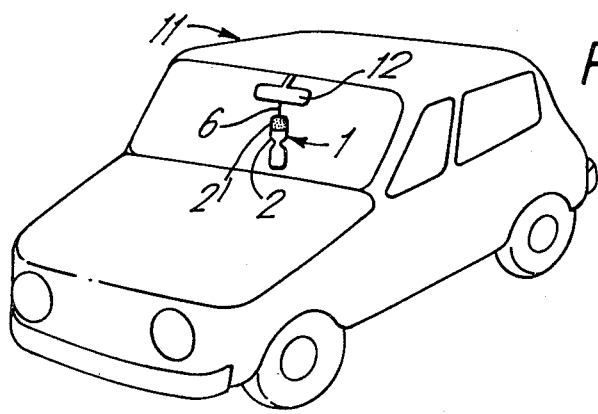
FIGS. 4 and 5 show the device of the invention used in car parking.

FIG. 4 shows the device according to the invention when used in car parking. Through the front window of a parked car 11 there is seen a container or indicator cartridge 1 which has been put into operation. In this connection the indicator cartridge 1 is of the type described in connection with FIGS. 1 and 2 and is by the thread 6, suspended from the rear-view mirror 12 of the car. The dark area 2' on the upper chamber 2 of the container 1 indicates lapsed parking time and indication that the container is in operation is indicated by its hanging on the thread 6.

Figure 5:
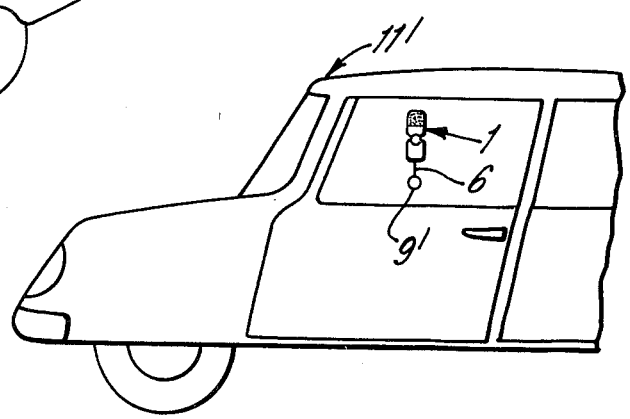

In FIG. 5 an indicator cartridge 1 of the type shown in FIG. 3 is shown to be affixed to the inside of a side window of the parked vehicle 11'; indication that the container is, in operation is in this case indicated by the fact that the ball 6 has been pulled out of the container 1 and is hanging stright under it due to the plate or ball 9'.

A parking supervisor can easily check whether the allotted parking time has expired. When the thread 6 has to be pulled out, he can also easily check whether the parking time indicator has been put into operation. If the thread 6 has not yet been pulled out from the container 1, the parking is unlawful.

When the container 1 is graduated with a time scale, the supervisor can also see how long time the vehicle has been parked and how much time of the allotted parking time is left.

The illustrated embodiments of the device of the invention may be varied within wide limits in so far as the idea of the once-for-all, i.e., discardable or single use of the container can be provided.

For instance, the tube 4 in FIGS. 1 to 3 may be helically shaped or otherwise curved, so that the outlet opening thereof lies in a plane which is not horizontal. By such a construction of the tube there will be achieved a further insurance that the sand flows in one direction only.

In-stead of the thread 6 shown in FIGS. 1 to 3, it is possible to place a thin film F at the transition portion between the filled and the empty chambers to prevent the sand from flowing from the filled to the empty chamber. This film F may be stretched across the lower wall portion of the filled chamber and placed immediately above the inlet to the tube 4 see phantom line in FIG. 2, for example. Further, the film may be of such a material that it breaks or is ruptured when the container is flexed around the middle. When the film breaks, the sand may flow through the tube to the lower chamber.

When using the present invention in connection with time limited and dutiable parking, parking meters of the known type are made superfluous. Containers according to the invention may be purchased in coin slot machines at the parking areas, or also at the gas stations or in kiosks. The containers may be marketed in an appropriate number in boxes or packages. As the containers may be purchased in advance, no coins are required for making use of the parking area. One takes one of the containers corresponding to the parking time estimated to be sufficient, puts it into operation and places it in a clearly visible position on the inside of the front window.

If the allotted parking time is not completely consumed, the same container may be used for another parking, possibly in a different place. Thereby the present invention provides a flexible and convenient parking system. It is of advantage to the car drivers, who get the full value of their parking expenses, and for the granting authorities, who will save the expenses in connection with the purchase and maintenance of parking meters.

What I claim is:

1. An irreversible-flow, "hour-glass" type timing device for measuring an elapsed time interval, comprising in combination:

a closed and at least partially transparent container;

said container comprising upper and lower chambers;

a quantity of flowable material in the upper chamber; and a transition portion between the chambers for permitting communication therebetween and flow of the material from the upper to the lower chamber, the improvement comprising the transition portion including a one-way throttle flow passage means connecting the upper and lower chambers, said throttle flow passage means including means for preventing reverse flow of the material between said chambers when the chambers are inverted; and manually operable stop means operatively connected to said one-way throttle flow passage means for initially preventing the flowable material from flowing from the upper to the lower chambers and manually manipulated to initiate one-way flow of the material between the chambers when an elapsed interval of time is to be measured, whereby complete emptying of the flowable material from the upper to the lower chamber renders the device exhausted to subsequently measure elapsed time.

2. The device as claimed in claim 1, characterized in that the flow passage means comprises a thin tube with a small inner diameter, the tube depending from the transition portion between the two chambers and substantially into the lower chamber and being constructed so that the flowable material after flowing through the tube from the upper to the lower chamber cannot flow back to the first chamber if the container is inverted.

3. The device as claimed in claim 2, characterized in that said manually operable stop means comprises a thread extending into the central portion of the tube, said thread initially closing the tube and the flow of flowable material and extending substantially along the longitudinal axis of the container and through one end portion thereof.

4. The device as claimed in claim 3, characterized in that the thread has a portion accessible exteriorly of the container whereby the flow passage is capable of being opened from outside the container by pulling the thread out of the passage and indicates that the timing device is in operation.

5. The device as claimed in claim 4, characterized in that the thread includes an outer end exteriorally of the container and including means for suspending the container.

6. The device as claimed in claim 3, characterized in that the thread includes means indicating that the compartments are in communication and material is flowing between the compartments.

7. The device as claimed in claim 1, characterized in that the stop means comprises a rupturable film which normally prevents the material from flowing, said film being disposed in the transition portion between the filled upper chamber and the empty lower chamber.

8. The device as claimed in claim 7, characterized in that the container is flexible for rupturing the film by deformation of the container to thereby allow the material to flow between the chambers.

9. The device as claimed in claim 1, characterized in that the container includes means for mounting the container on a plane surface.

10. The device as claimed in claim 1, characterized in that the upper chamber to be emptied, and the flowable material have different colours so as to clearly indicate the difference between the full and empty upper chamber.

11. The device as claimed in claim 1, characterized in that at least one of the chambers includes a graduated time scale, which is calibrated in relation to the quantity of flow per unit of time for indicating an increment of the total elapsed time as the material flows through the flow passage.

* * * * *